United States Patent
Rossi

[11] 3,783,659
[45] Jan. 8, 1974

[54] BICYCLE SECURING APPARATUS

[76] Inventor: Gerald F. Rossi, 715 4th St., San Ramon, Calif. 94607

[22] Filed: June 29, 1972

[21] Appl. No.: 267,508

[52] U.S. Cl. .................................. 70/234, 211/5
[51] Int. Cl. ............................................ E05b 71/00
[58] Field of Search ............... 70/234, 235; 194/40, 194/49, 64; 211/5, 7, 22; 224/42.033, 42.25

[56] References Cited
UNITED STATES PATENTS

| | | | |
|---|---|---|---|
| 581,499 | 4/1897 | Wallingford | 194/40 |
| 617,693 | 1/1899 | Schultz | 194/40 |
| 1,202,444 | 10/1916 | Soleau | 211/4 |

FOREIGN PATENTS OR APPLICATIONS

| | | | |
|---|---|---|---|
| 223,458 | 3/1943 | Switzerland | 70/234 |
| 8,249 | 1898 | Great Britain | 70/234 |

Primary Examiner—Albert G. Craig, Jr.
Attorney—Harris Zimmerman

[57] ABSTRACT

A device for locking a bicycle in place has a base fixed relative to the ground, and a pair of arms upwardly extending from the base. Each arm has a cross bar fixed to its upper end, and one arm is pivotally attached to the base so as to be movable towards and away from the other arm. The cross bar fixed to the pivotable arm has three shafts extending therefrom generally toward the other cross bar. When the pivotable arm is positioned away from the other arm, the bicycle may be positioned between the arms and is in proper position for locking. Swinging of the pivotable arm toward the other arm brings the shafts through the body of the bicycle, one passing through the frame of the bicycle and the other two passing through the front and rear wheels respectively. The extended ends of the shaft are brought into close proximity with the other cross bar by the pivoting, and a lock is provided to hold the ends of the shafts in such close proximity so that the bicycle may be secured between the arms.

7 Claims, 10 Drawing Figures

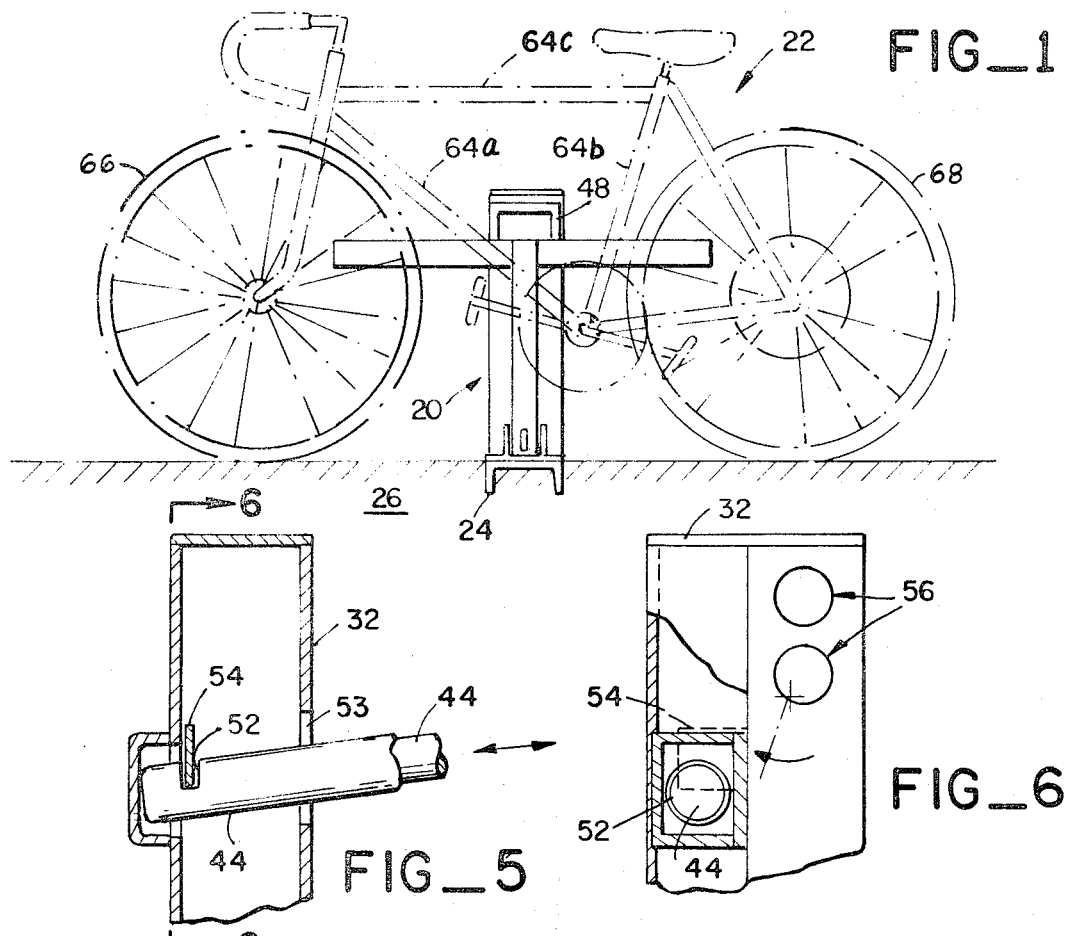
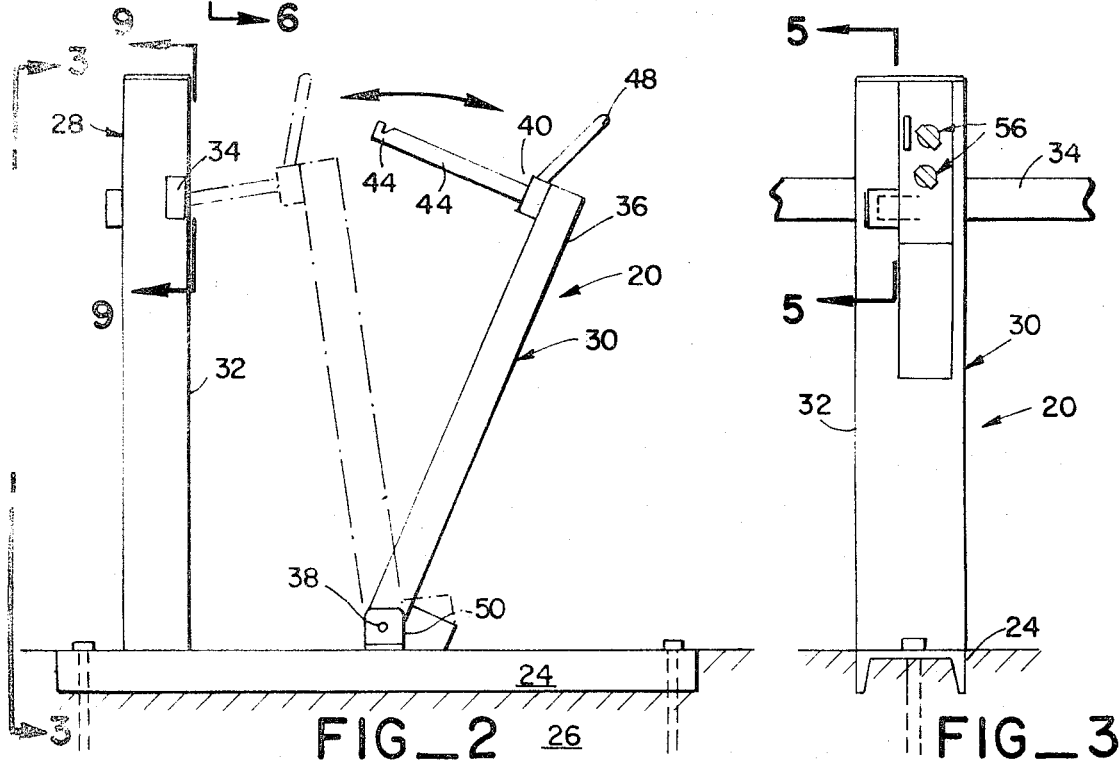

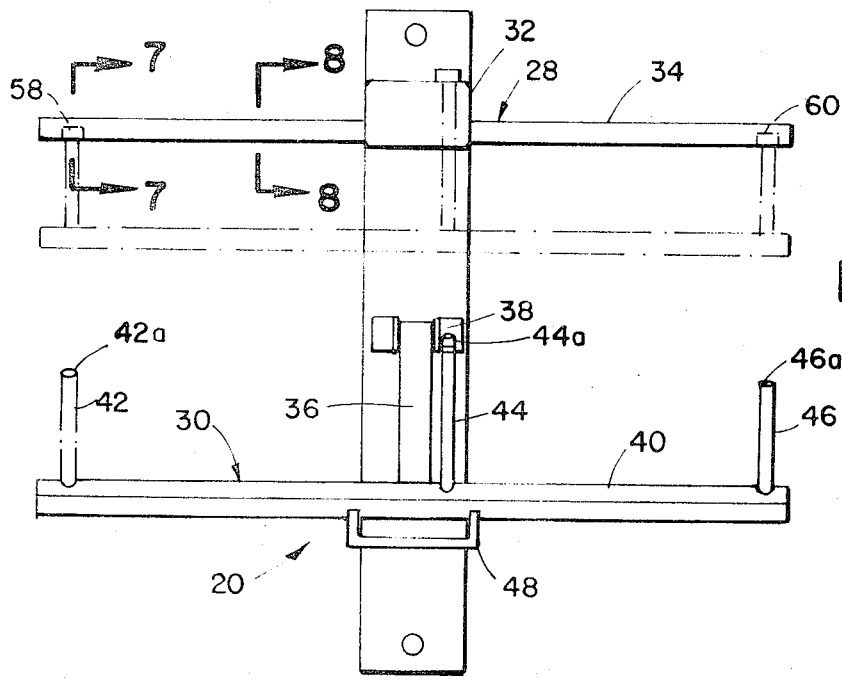
FIG_4
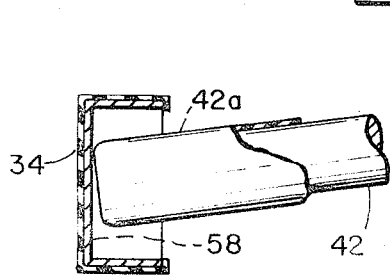
FIG_7
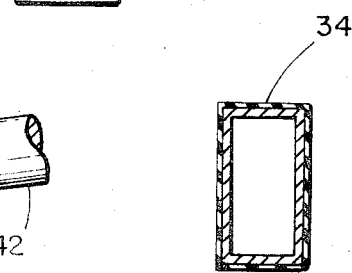
FIG_8
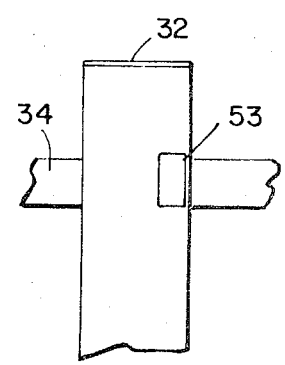
FIG_9
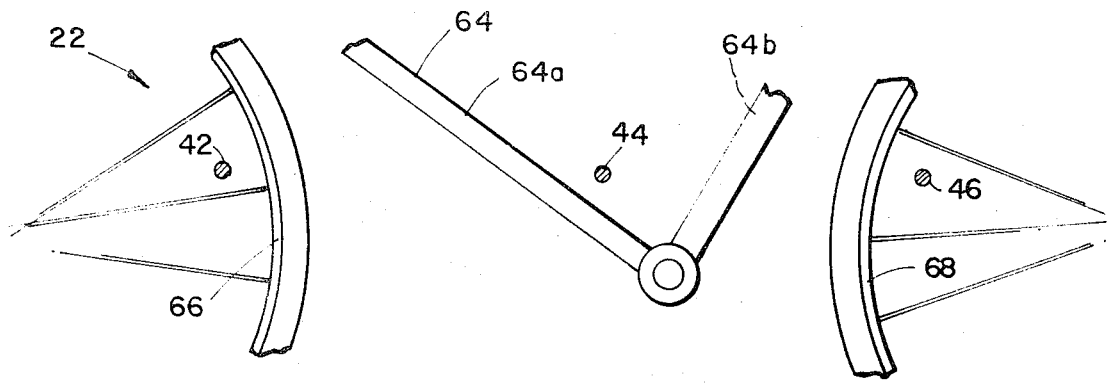
FIG_10

BICYCLE SECURING APPARATUS

BACKGROUND OF THE INVENTION

This invention relates to bicyle-securing apparatus, and more particularly, to apparatus which provides means for securing a bicycle at a plurality of points.

Devices for securing bicycles to discourage theft thereof are of course well known. Ideally, such a device should provide means for locking the bicycle with a high degree of security, so that it cannot easily be broken apart. Also, such a device should hold the bicycle in a stable manner, and should of course be easy and convenient to use.

Generally, known devices provide a single means for securing a wheel of the bicycle to the device itself, most commonly by means of a single pin passing through a rim of the bicycle and being locked in place. Such a system, however, has shortcomings in that the locking pin is generally of the type that can be easily broken with the end of a crowbar, and that such a pin provides only a single securing point for holding the bicycle in position.

It is an object of the invention to provide a bicycle locking apparatus which includes means for securing the bicycle with a relatively high degree of security.

It is a further object of this invention to provide a bicycle locking device which holds the bicycle in a stable and secure manner, and in addition is easy and convenient to use.

SUMMARY OF THE INVENTION

Broadly stated, the bicycle securing apparatus disclosed herein comprises a base, a first arm fixed to the base and extending upwardly therefrom, and a second arm, one end of which is associated with the base so that the other end may be moved toward and away from the first arm. In this way, inward and outward positions of the second arm in relation to the first arm are defined. A first cross bar is fixed to the extended end of the first arm, and a second cross bar is fixed to the other end of the second arm and movable therewith. A plurality of shafts extend from the second cross bar generally toward the first cross bar, the cross bars and shafts being positioned so that the extended ends of the shaft are in close proximity to the first cross bar when the inward position is defined. The arms, cross bars, and shafts are located to allow positioning of the body of the bicycle so that each shaft is continuously surrounded by bicycle elements, and so limit removal of the bicycle from the apparatus when the inward position of the second arm is defined. Means are included for selectively holding the second arm in its inward position.

THE DRAWINGS

Other objects of the invention will become apparent from a study of the following specification and drawings, in which:

FIG. 1 is an overall elevation of the bicycle securing apparatus showing the bicycle in place;

FIG. 2 is a side sectional view of the bicycle securing apparatus showing the pivoting movement of one arm thereof;

FIG. 3 is a view taken along line 3—3 of FIG. 2;

FIG. 4 is a plan view of the bicycle securing apparatus;

FIG. 5 is a sectional view taken along line 5—5 of FIG. 3;

FIG. 6 is a view, partially broken away, taken along line 6—6 of FIG. 5;

FIG. 7 is a sectional view taken along line 7—7 of FIG. 4; FIG. 8 is a sectional view taken along line 8—8 of FIG. 4;

FIG. 9 is a view taken along line 9—9 of FIG. 2;

FIG. 10 is a side elevation of a bicycle, with portions removed, showing the locking shaft positions relative thereto.

DESCRIPTION OF THE PREFERRED EMBODIMENT

Shown generally in FIGS. 1, 2 and 4 is the bicycle securing apparatus 20 of the present invention, designed and constructed for securing a bicycle 22. Such apparatus includes a base 24, (in this particular embodiment a beam of U-cross-section), which may be fixed in the ground 26. (It will be understood that the term "base" is to be defined in the broad sense, i.e., the base could be the ground itself, etc.)

Base 24 has a pair of members 28, 30 extending therefrom and associated therewith in a way which will now be described in detail. Member 28 combines an arm 32 fixed to the base 24 and extending upwardly therefrom, and a cross bar 34 fixed to the extended end of arm 32. Member 30 combines an arm 36 pivotally attached to the base 24 by means of hinge 38 and upwardly extending therefrom. Member 30 further comprises a cross bar 40 fixed to the extended end of arm 36, i.e., the end of arm 36 removed from the hinge 38. In addition, member 30 comprises shafts 42, 44, 46 which are spaced apart and are substantially parallel to each other. These shafts 42, 44, 46 extend generally toward cross bar 34. It will be seen that member 30, made up of arm 36, cross bar 40, and shafts 42, 44, 46, by means of pivoting of hinge 38, is movable inwardly and through pivoting of hinge 38, is movable inwardly and outwardly relative to member 28 so as to define inward and outward positions of member 30 relative to member 28 as shown clearly in FIGS. 2 and 4. In this embodiment, of course, it is the arm 36 which does the pivoting, with cross bar 40 and shafts 42, 44, 46 moving therewith. A handle 48 is fixed to cross bar 40 to allow the member 30 to be pivoted conveniently by the user of the apparatus 20. A stop arm 50 is fixed to arm 36 adjacent to hinge 38 to in fact determine the outward pivoting position of arm 36, and is positioned to insure that handle 48 is easily reached when member 30 is in its outward position.

It will be seen that the arms 32, 36, cross bars 34, 40 and shafts 42, 44, 46 are positioned so that the extended end 44a of shaft 44 (which is actually to be considered a portion of member 30) is in close proximity to the arm 32 (which is actually to be considered as a portion of member 28). In fact, the details of this are shown in FIGS. 3, 5, 6 and 9. Extended end 44a of shaft 44 passes through aperture 53 in arm 32, and has therein a slot 52, which is positioned to receive a locking member 54 associated with arm 32. Such locking member 54 may be engaged to and disengaged from slot 32 by any well-known means, such as the key system 56 shown in general in FIG. 3. With such means, the extending end 44a of shaft 44 may be selectively held in close proximity to arm 32. With the locking means disengaged, the member 30 may be moved to its outward position so that extended end 44a of shaft 44 is removed from the arm 32.

Shafts 42 and 46 have extended ends 42a and 46a, respectively (also to be considered portions of member 30), which are positioned to be in close proximity to cross bar 34 when the inward position of member 30 is defined, in fact seating in recesses 58 and 60 respectively, formed in the cross bar 34 (FIG. 7). With member 30 moved to its outward position, extended ends 42a, 46a are removed from cross bar 34.

The arms 32, 36, cross bars 34, 40 and shafts 42, 44, 46 are located to allow easy positioning of the bicycle body 62 therebetween when the outward position of arm 36 is defined. ("Bicycle body" in this specification means all parts of the bicycle 22, i.e., frame, wheels, seat, etc.).

In the use of apparatus 20, the member 30 is in its outward position as shown in full in FIGS. 2 and 4. The bicycle 22 is then positioned between members 28, 30 and is ready to be locked in place. With the bicycle 22 in such position, member 30 is moved from its outward position to its inward position shown in phantom in FIGS. 2 and 4, by means of handle 48. This brings extended end 44a of shaft 44 into close proximity with arm 32, and extended ends 42a, 46a of shafts 42, 46 in close proximity with cross bar 34, as described above. As the member 30 is moved from its outward position to its inward position, shafts 42, 44, 46 pass through portions of the body 62 of bicycle 22 so that each shaft is continuously surrounded by bicycle elements (the exact positioning of the shafts 42, 44, 46 is shown in FIG. 10). In fact, shaft 44 is positioned to pass through the frame and be completely surrounded by frame members 64a, 64b, 64c, shaft 42 is positioned to pass through and be completely surrounded by front wheel 66, and shaft 46 is positioned to pass through and be completely surrounded by rear wheel 68. It is at this point that locking member 54 engages slot 52 to hold the member 30 in its inward position. Removal of the keys at this time completes the locking of the bicycle 22. (A system may be included whereby a coin must be inserted before the key may be removed.)

To remove the bicycle 22, of course, the key is turned to remove locking member 54 from slot 52, so that member 30 may be pivoted back to its outward position. The bicycle 22 may then be removed.

It will be seen that herein is provided a bicycle locking apparatus which is easy to use and effective. The plurality of shafts disposed through the body of the bicycle means a stable and secure holding of the bicycle, in turn discouraging possible theft of the bicycle.

I claim:

1. Bicycle securing apparatus comprising a base, a first member extending from the base, a second member associated with the base so as to be movable towards and from said first member to define inward and outward positions relative thereto, with a portion of the second member being in close proximity to a portion of the first member when said inward position is defined, and said portion of the second member being removed from the portion of the first member when said outward position is defined, said first and second members being located to allow positioning of the bicycle body therebetween when said outward position is defined, said portion of the second member having a first element extending generally normal to the second member and engageable with said portion of the first member when said inward position is defined and adapted to be releasably locked to said first member in such engaged position, said first element being positioned to pass through the frame of a bicycle body disposed between said members and be continuously surrounded by such frame, and said second member further having a pair of second elements disposed on opposite sides of said first element and movable with said second member, said second elements being engageable with the wheels of a bicycle when said inward position is defined.

2. Apparatus as set forth in claim 1 in which said second member is pivotally attached to said base.

3. Apparatus as set forth in claim 1 in which said second elements extend generally normal to the second member in general parallelism with said first element.

4. Bicycle securing apparatus comprising a base, a first arm fixed to the base and extending upwardly therefrom, a second arm one end of which is associated with the base so that the other end may be moved toward and away from the first arm, so as to define inward and outward positions of the second arm in relation to the first arm, a first cross bar fixed to the extended end of the first arm, a second cross bar fixed to the other end of the second arm and movable therewith, a plurality of shafts extending from the second cross bar generally toward the first cross bar, said arms, cross bars and shafts being positioned so that the extended end of one of said shafts is in close proximity to the first arm, and the extended ends of the remaining shafts are in close proximity to the first cross bar when said inward position is defined, the first and second arms, cross bars, and shafts being located to allow positioning of the bicycle body therebetween when said outward position is defined, the shafts being positioned to pass through portions of the body of the bicycle so that each shaft is continuously surrounded by bicycle elements and to so limit removal of the bicycle from the apparatus, when the inward position of the second arm is defined, and means for selectively holding the second arm in its inward position.

5. Apparatus according to claim 4 wherein the plurality of shafts comprises three spaced substantially parallel shafts the first of which passes through a part of the frame of the bicycle so as to be continuously surrounded by bicycle frame members, the second of which passes through one rim of the bicycle so as to be continuously surrounded by said one rim, and the third of which passes through the other rim of the bicycle so as to be continuously surrounded by said other rim.

6. Apparatus according to claim 5 wherein the means for selectively holding the second arm in its inward position comprises locking means associated with the first arm for receiving and selectively holding the extended arm of the first shaft.

7. Apparatus according to claim 6 wherein the one end of the second arm is pivotally attached to the base so as to be movable toward and away from the first arm.

* * * * *

Notice of Adverse Decision in Interference

In Interference No. 98,753, involving Patent No. 3,783,659, G. F. Rossi, BICYCLE SECURING APPARATUS, final judgment adverse to the patentee was rendered Oct. 8, 1976, as to claims 1, 2 and 3.

[*Official Gazette March 22, 1977.*]